United States Patent [19]

Sugata et al.

[11] Patent Number: 5,589,860
[45] Date of Patent: Dec. 31, 1996

[54] INK JET RECORDING HEAD AND METHOD OF PRODUCING THE SAME

[75] Inventors: Yoshinobu Sugata; Mikio Yamazaki; Takashi Umegaki, all of Kanagawa, Japan

[73] Assignee: Fuji Electric Co., Ltd., Kanagawa, Japan

[21] Appl. No.: 288,056

[22] Filed: Aug. 10, 1994

[30] Foreign Application Priority Data

Aug. 11, 1993 [JP] Japan .................................. 5-198691
Mar. 7, 1994 [JP] Japan .................................. 6-035128

[51] Int. Cl.$^6$ .................................................. B41J 2/025
[52] U.S. Cl. ................................ 347/20; 347/70; 347/71
[58] Field of Search .................................. 347/70, 71, 20

[56] References Cited

U.S. PATENT DOCUMENTS 5,396,042  3/1995  Ishida et al. .................................. 347/71

FOREIGN PATENT DOCUMENTS

0481788A1  4/1992  European Pat. Off. .
0564087A1  10/1993  European Pat. Off. .
3623776A1  1/1987  Germany .
4221719A1  7/1993  Germany .

OTHER PUBLICATIONS

F. P. Giordano and R. Lane, "Noncorrosive Bonding Technique for Silicon Nozzles in Ink Jet Printing," IBM Technical Disclosure Bulletin, vol. 19, No. 7, Dec. 1976, pp. 2790–2791.

M. Wild, "Bilayer Aperture Plate Bonding," Xerox Disclosure Journal, vol. 8, No. 2, Mar./Apr. 1983, p. 89.

Primary Examiner—Valerie A. Lund
Attorney, Agent, or Firm—Finnegan, Henderson, Farabow, Garrett & Dunner, L.L.P.

[57] ABSTRACT

Both a cavity plate and a vibrating plate are made of polyether imide resin, and a polysulfone resin film having a thickness of 3 μm is formed on one or both of the joining faces of the plates. The melt temperature of polysulfone resin is about 190° C., and the heat deformation temperature of polyether imide resin is about 200° C. When the cavity plate and the vibrating plate are contacted with each other through the polysulfone resin films and then heated at 190° C. for one hour, therefore, the polysulfone resin films are fused to become a fused layer so that the plates are firmly joined. Since the heat deformation temperature of the cavity plate is 200° C. which is higher by 10° C. than the melt temperature (190° C.) of the polysulfone resin films, the fusion does not cause ink flow paths of nozzles, etc. to be heat-deformed.

5 Claims, 2 Drawing Sheets

INK JET RECORDING HEAD AND METHOD OF PRODUCING THE SAME

BACKGROUND OF THE INVENTION

1. Field of the Invention

The invention relates to an ink jet recording head and a method of producing the ink jet recording head in which, when a cavity plate and a vibrating plate that are made of plastic are joined to each other by means of fusion, a firm joining is realized and shapes of nozzles and flow paths are maintained.

2. Description of the Related Art

Conventionally, a recording method in which ink is ejected from minute nozzles to adhere to a recording medium such as a sheet of paper is known as the ink jet recording method. As one of the principles of the ink jet recording methods, there is the on-demand ink Jet printing method. Generally, an ink Jet recording head (hereinafter, referred to as "recording head") according to this method has a structure shown in FIG. 5 which is a plan view as seen from the side of grooves of a cavity plate and FIG. 6 which is a section view thereof. Specifically, a vibrating plate 19 is placed on a cavity plate 11 in which plural ink ejection nozzles 12, ejection flow paths 13, ink pressurizing chambers 15, ink supply paths 16, filter flow paths 18, and a common ink reservoir 17 are formed by conducting an etching or machining process on a plate made of glass, metal or the like, and integrated with the cavity plate 11. Piezoelectric elements 20 functioning as electromechanical transducers are then joined through a conductive film 21 to positions of the outer side face of the vibrating plate 19 which confront the ink pressurizing chambers 15, respectively.

In this structure, when a voltage is applied as an electrical signal to one of the piezoelectric elements 20, the vibrating plate 19 is displaced toward the ink pressurizing chamber 15 so that the volume of the chamber 15 is rapidly reduced. An amount of ink corresponding to the reduced volume is ejected from the corresponding nozzle 12 to fly in the form of an ink droplet, and then impacted on an opposing recording sheet to conduct a printing.

In the prior art example, when the cavity plate 11 is made of a silicon wafer and the vibrating plate 19 is made of a glass plate, the cavity plate 11 and the vibrating plate 19 are joined to each other by an electrostatic joining technique. When both the cavity plate 11 and the vibrating plate 19 are made of plastic, they are joined to each other by a technique in which an adhesive is used or that in which plastic itself is heated to melt and then fused to each other. These joining techniques have a common defect that the joining has a weak durability and hence the flow paths cannot maintain their correct shape and are slightly deformed. Therefore, it has been demanded to develop a joining technique which exhibits a high reliability. In the view points of durability and rigidity, for example, engineering plastics such as polyether imide, polysulfone, polyether ketone, and polyether sulfone have been studied as materials of such a cavity plate and a vibrating plate. Generally, it is difficult to join these materials by an adhesive. Therefore, it has been studied to employ a method in which these materials are joined by means of fusion. Such a joining method using fusion has an advantage that a joining with very high reliability is obtained because there is no adhesion interface of foreign material such as an adhesive, but has a problem that minute ink flow paths formed on the surface of the cavity plate are heat-deformed by heat in the joining process.

SUMMARY OF THE INVENTION

An object of the invention is to provide an ink jet recording head and a method of producing the ink jet recording head which can solve the problem with the prior art and in which, particularly when a cavity plate and a vibrating plate that are made of plastic are joined to each other by means of fusion, a firm joining is realized and shapes of nozzles and flow paths are maintained.

In the ink jet recording head according to the invention, a cavity plate and a vibrating plate are joined to each other through a plastic layer having a melting temperature which is lower than heat deformation temperatures of the cavity plate and the vibrating plate. The cavity plate and the vibrating plate may be made of polyether imide resin, and the plastic layer is made of a resin selected from a group consisting of polysulfone resin, polyarylate resin, polyester resin, high heat-resistant polycarbonate resin, and polyphenylene ether resin.

The production method according to the invention comprises: a coating step of coating at least one of joining faces of a cavity plate and a vibrating plate with a plastic having a melting temperature which is lower than heat deformation temperatures of the cavity plate and the vibrating plate; and a joining step of conducting fusion on the cavity plate and the vibrating plate through fusion of the plastic coating at a temperature which is lower than the heat deformation temperatures of the cavity plate and the vibrating plate.

The coating step may be a step of coating the joining faces of the cavity plate and the vibrating plate with a plastic having a melting temperature which is lower than heat deformation temperatures of the cavity plate and the vibrating plate. Alternatively, the coating step may be a step of coating the whole face of the cavity plate and the joining face of the vibrating plate with a plastic having a melting temperature which is lower than heat deformation temperatures of the cavity plate and the vibrating plate.

In the ink jet recording head according to the invention, a cavity plate is joined to a vibrating plate through a plastic layer having a melting temperature which is lower than heat deformation temperatures of the plates. When the cavity plate and the vibrating plate are joined to each other by means of fusion at the melting temperature of the plastic layer, therefore, the temperature is lower than the heat deformation temperatures of the cavity plate and the vibrating plate, whereby nozzles and flow paths formed in the cavity plate are prevented from heat-deforming.

In the production method according to the invention, the plastic used in the coating step has a melt temperature which is lower than heat deformation temperatures of the cavity plate and the vibrating plate, and the fuse joining in the joining step is conducted at that temperature. In the joining step, consequently, nozzles and flow paths formed in the cavity plate are prevented from being heat-deformed.

In the case where the whole surface of the cavity plate and the joining face of the vibrating plate are coated by plastic, the inner faces of nozzles and flow paths are coated by the plastic.

The above and other objects and features of the present invention will be more apparent from the following description taken in conjunction with the accompanying drawings.

DETAILED DESCRIPTION OF THE PREFERRED EMBODIMENTS

Figure 1:
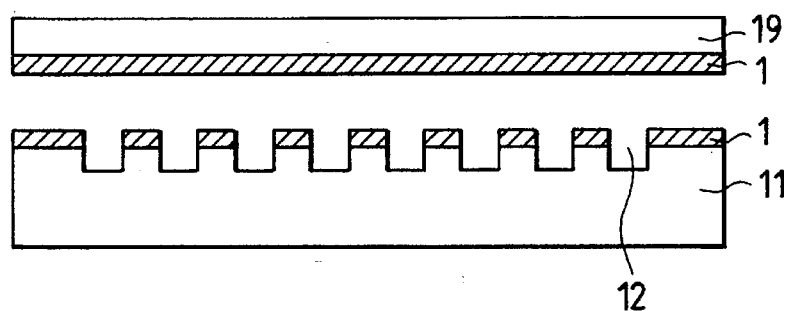
FIG. 1 is a sectional view showing a state in which a cavity plate and a vibrating plate have not yet been joined to each other according to an embodiment of the invention.
Figure 2:
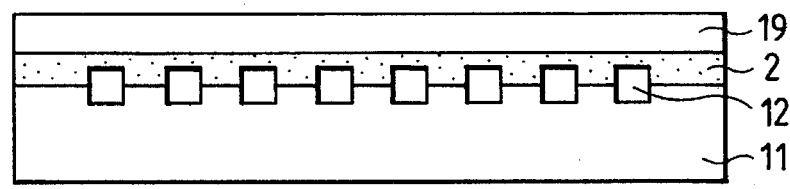
FIG. 2 is a sectional view showing a state in which the plates have been joined to each other.
Figure 5:
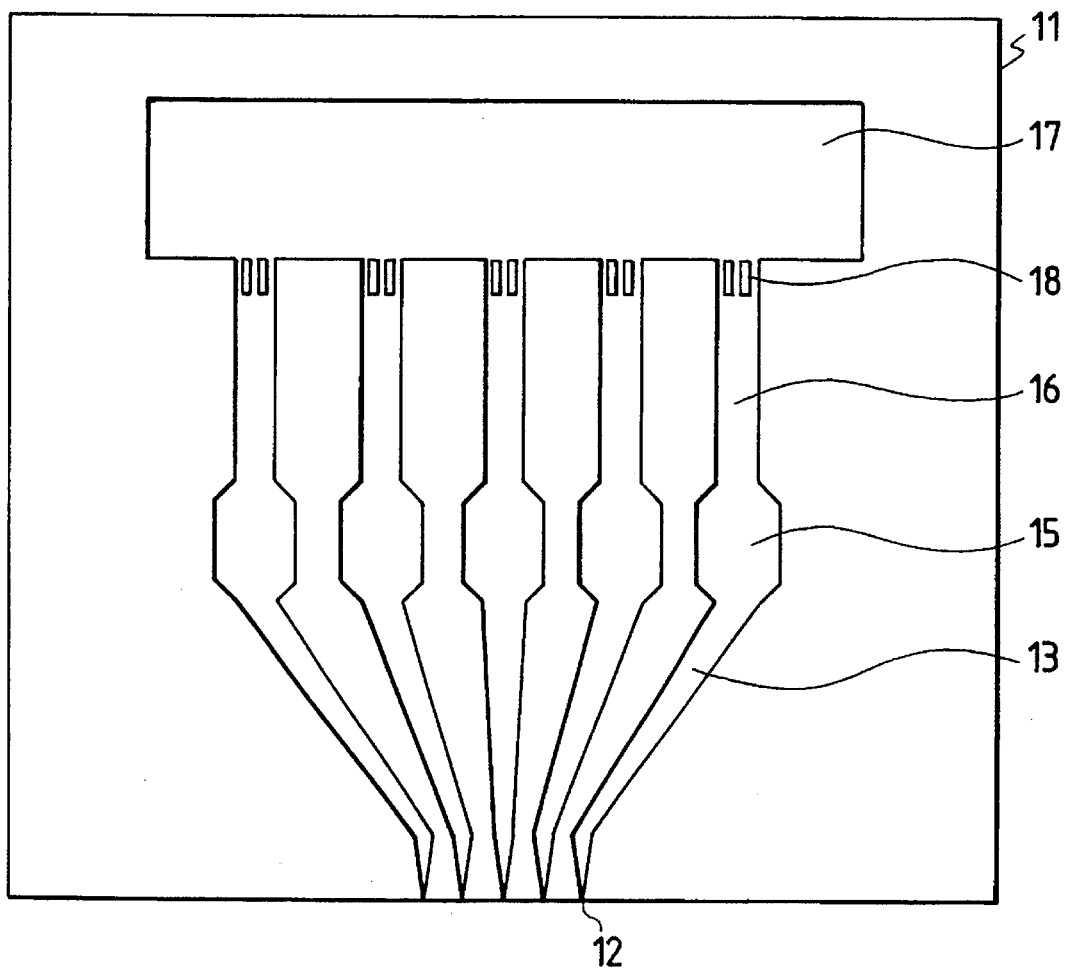
FIG. 5 is a plan view which is common to the embodiments of the invention and a prior art example.
Figure 6:
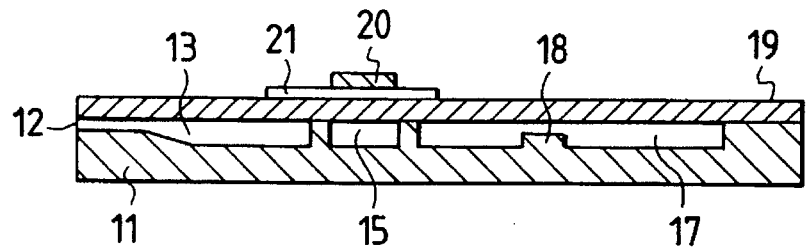
FIG. 6 is a sectional view which is common to the embodiments of the invention and a prior art example.

Embodiments of the invention will be described with reference to the accompanying drawings. In the embodiments, ink jet recording heads may have a similar configuration as that shown in FIGS. 5 and 6. FIG. 1 is a sectional view showing a state in which a cavity plate and a vibrating plate of a recording head have not yet been joined to each other, and FIG. 2 is a sectional view showing a state in which the plates have been joined to each other. In FIG. 1, both the cavity plate 11 and the vibrating plate 19 are made of polyether imide resin, and a polysulfone resin film 1 having a thickness of 3 μm is formed on one or both of the joining faces of the plates. Generally, the thickness of the film is selected so as to be 1 to 10 μm. The melting temperature of polysulfone resin is about 190° C., and the heat deformation temperature of polyether imide resin is about 200° C. When the cavity plate 11 and the vibrating plate 19 shown in FIG. 1 are contacted with each other through the polysulfone resin films 1 and then heated at 190° C. for one hour, therefore, the polysulfone resin films 1 are fused to become a fused layer 2 as shown in FIG. 2 so that the plates are firmly joined. Since the heat deformation temperature of the cavity plate 11 is 200° C. which is higher by 10° C. than the melting temperature (190° C.) of the polysulfone resin films 1, furthermore, the fusion does not cause ink flow paths of nozzles 12, etc. to be heat-deformed. As a specific method of fusion, a method using a thermostatic chamber, or an ultrasonic heating method may be employed. In the production method, since the polysulfone resin films are only subjected to the fusion, it is effective and appropriate to apply a high energy by an ultrasonic fusion method so that the fusion process is completed in a short time. The cavity plate and the vibrating plate are not required to be made of the same material, and may be made of a material other than plastic, or a metal or a ceramic material. As to the resin film, in place of the polysulfone resin films 1, a film may be used which is made of a resin selected from a group consisting of polyarylate resin (melting temperature: about 185° C.), polyester resin (about 188° C.), high heat-resistant polycarbonate resin (about 186° C.), and polyphenylene ether resin (about 187° C.) that have a melting temperature lower than that of polysulfone resin.

Figure 3:
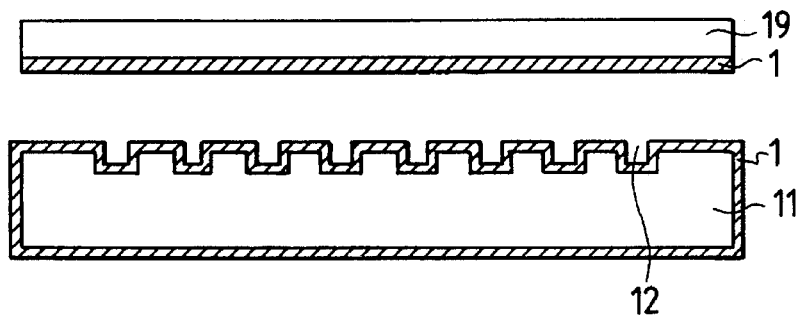
FIG. 3 is a sectional view showing a state in which a cavity plate and a vibrating plate have not yet been joined to each other according to another embodiment of the invention.
Figure 4:
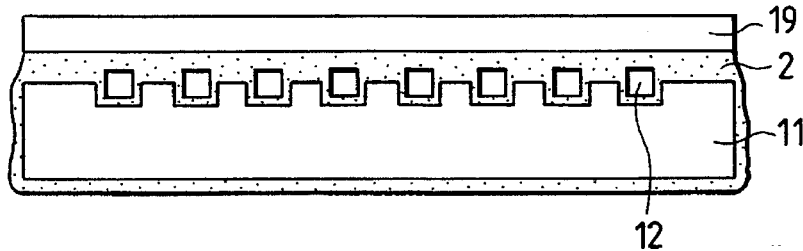
FIG. 4 is a sectional view showing a state in which the plates have been joined to each other.

FIG. 3 is a sectional view showing a state in which a cavity plate and a vibrating plate of another embodiment of the recording head have not yet been joined to each other, and FIG. 4 is a sectional view showing a state in which the plates have been joined to each other. The embodiment is different from the above-described embodiment in that the formation of the polysulfone resin film 1 on the cavity plate 11 is formed on the whole surface of the cavity plate 11 including the ink flow paths such as the nozzles 12. When the cavity plate 11 and the vibrating plate 19 are subjected to fusion at 190° C., therefore, the joining faces become the fused layer 2 so that the plates are firmly joined, and, as shown in FIG. 4, the polysulfone resin film 1 remains to be formed on the outer peripheral face of the cavity plate 11 and the inner faces of nozzles 12. This modified production method has the following advantages: A first advantage is that the polysulfone resin film 1 can easily be coated on the cavity plate 11. When, as in the case of the previous embodiment, the polysulfone resin film 1 has to be coated so as to avoid the ink flow paths such as the nozzles 12, a complex and cumbersome work of applying a solution of polysulfone resin must be conducted by using a special printing method or a roller coating method. In contrast, according to this modified embodiment, the application can be accomplished by a simple application work such as a dip coating method. A second advantage is that the formation of the polysulfone resin film 1 on the inner faces of the nozzles 12 allows the inner faces of the flow paths to have an affinity for ink and improved ink-resistance, resulting in an improved printing property and reliability. In the same manner are described above, in place of the polysulfone resin films 1, a film may be used which is made of a resin selected from a group consisting of polyarylate resin, polyester resin, high heat-resistant polycarbonate resin, and polyphenylene ether resin.

In the ink jet recording head according to the invention, a cavity plate is joined to a vibrating plate through a plastic layer having a melting temperature which is lower than heat deformation temperatures of the plates. When the cavity plate and the vibrating plate are joined to each other by means of fusion at the melting temperature of the plastic, therefore, nozzles and flow paths formed in the cavity plate are prevented from heat-deforming at the temperature. Consequently, the joining of the cavity plate and the vibrating plate produced by means of fusion is firm and the shapes of the nozzles and the flow paths are maintained, and hence the ink ejecting property is satisfactorily maintained, with the result that the printing quality is satisfactorily maintained.

In the production method according to the invention, plastic having a melting temperature which is lower than heat deformation temperatures of a cavity plate and a vibrating plate is applied in the coating step. When the cavity plate and the vibrating plate are joined to each other by fusion at the melting temperature of the plastic, therefore, nozzles and flow paths formed in the cavity plate are prevented from heat-deforming at that temperature. Consequently, the joining of the cavity plate and the vibrating plate produced by means of fusion is firm and the shapes of the nozzles and the flow paths are maintained, and hence the ink ejecting property is satisfactorily maintained, with the result that the printing quality is satisfactorily maintained. In the case where the plastic coating is formed only on one of the joining faces, particularly, the process is simplified so that the production cost is reduced.

In the case where the whole surface of the cavity plate and the surface of the vibrating plate are coated by plastic, the process of forming the coating is simplified so that the production cost is reduced. Since the coating is formed on the inner faces of the nozzles and flow paths, the affinity for ink and the ink-resistance are improved, resulting in that the improvement of the printing quality and reliability is enhanced.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An ink jet recording head comprising;

a cavity plate;

vibrating plate; and a plastic layer through which said cavity plate and said vibrating plate are joined, said plastic layer having a melting temperature which is lower than heat deformation temperatures of said cavity plate and said vibrating plate;

wherein said cavity plate and said vibrating plate are made of polyether imide resin, and said plastic layer is made of a resin selected from a group consisting of polysulfone resin, polyarylate resin, polyester resin, high heat-resistant polycarbonate resin, and polyphenylene ether resin.

2. A method of producing an ink jet recording head, comprising the steps of:

coating at least one of joining faces of a cavity plate and a vibrating plate with a plastic having a melting temperature which is lower than heat deformation temperatures of said cavity plate and said vibrating plate to produce a plastic coating thereon; and joining said cavity plate and said vibrating plate through fusion of said plastic coating at a temperature which is lower than the heat deformation temperatures of said cavity plate and said vibrating plate;

wherein said cavity plate and said vibrating plate are made of polyether imide resin, and said plastic is made of a resin selected from a group consisting of polysulfone resin, polyarylate resin, polyester resin, high-heated resistant polycarbonate resin, and polyphenylene ether resin.

3. A method of producing an ink jet recording head according to claim 2, wherein said coating step comprises coating the whole face of said cavity plate and the joining face of said vibrating plate with a plastic having a melt temperature which is lower than heat deformation temperatures of said cavity plate and said vibrating plate.

4. A method of producing an ink jet recording head according to claim 2, wherein said coating step comprises coating joining faces of both said cavity plate and said vibrating plate with a plastic having a melt temperature which is lower than heat deformation temperatures of said cavity plate and said vibrating plate.

5. A method of producing an ink jet recording head, comprising the steps of:

coating at least joining faces of a cavity plate and a vibrating plate with a plastic having a melting temperature which is lower than heat deformation temperatures of said cavity plate and said vibrating plate to produce a plastic coating thereon; and joining said cavity plate and said vibrating plate through fusion of said plastic coating at a temperature which is lower than the heat deformation temperatures of said cavity plate and said vibrating plate;

wherein said coating step comprises coating the whole joining face of said cavity plate, including internal surfaces of flowpaths formed therein, and the joining face of said vibrating plate with a plastic having a melt temperature which is lower than heat deformation temperatures of said cavity plate and said vibrating plate.

* * * * *